United States Patent [19]

Wilmot

[11] 3,878,530

[45] Apr. 15, 1975

[54] RADAR VIDEO PROCESSING APPARATUS

[75] Inventor: Richard Dean Wilmot, Fullerton, Calif.

[73] Assignee: Hughes Aircraft Company, Culver City, Calif.

[22] Filed: Mar. 15, 1965

[21] Appl. No.: 440,024

[52] U.S. Cl. .............................................. 343/5 DP

[51] Int. Cl. .............................................. G01s 7/44

[58] Field of Search ............ 343/5 DP, 7 A, 17.1 R; 340/146.3

[56] References Cited

UNITED STATES PATENTS

| | | | |
|---|---|---|---|
| 3,503,068 | 3/1970 | Yamauchi | 343/5 DP X |
| 3,727,215 | 4/1973 | Wilmot | 343/5 DP |

*Primary Examiner*—T. H. Tubbesing

*Attorney, Agent, or Firm*—James K. Haskell; Robert H. Himes

EXEMPLARY CLAIM

1. An apparatus for processing successive video sweeps generated by a radar system and quantized into a series of range bins each including a 1 or a 0 representing a target hit or no target hit, respectively, said apparatus comprising: a memory device have a plurality of channels including 1, 2, 3, . . . ($n$-1), $n$ channels for storing $n$ successive quantized video sweeps from said radar system, $n$ being an integer no less than three, and A, B, active and reject channels for storing first and second code bits, active bits and reject bits, respectively; means coupled to said memory device and including a read address and a write address for reading from and writing into successive range bins of said plurality of channels in a direction corresponding to increasing ranges; means coupled from said read to said write address for transferring said quantized video from said 1, 2, 3, . . . ($n$-1) channels to said 2, 3, . . . $n$ channels, respectively; means coupled from said $n$ channels of said read address to said active bit channel of said write address for generating an active bit in response to $m$ 1's from the respective range bins of said $n$ channels, $m$ being an integer less than $n$; means coupled from said $n$ channels of said read address to said active bit channel of said write address for erasing said active bit and any corresponding bit in said reject channel in response to a predetermined number less than $m$ 1's from the respective range bins of said $n$ channels; means coupled from said A, B and reject channels of said read address to said A, B, reject and said 1 channel of said $n$ channels of said write address and responsive to said quantized video sweeps generated by said radar system for generating and writing a code in said A and B channels indicative of predetermined successive occurrences of 1's in said quantized video sweeps, for generating and writing 1 bits in said reject channel indicative of predetermined successive occurrences of 1's in corresponding range bins of no less than two successive video sweeps, and for writing said quantized video in said 1 channel of said $n$ channels; and utilization means responsive to the simultaneous existence of 1's in said active channel and to the nonexistence of 1's in said reject channel for indicating targets detected by said radar.

8 Claims, 6 Drawing Figures

INVENTOR.
RICHARD DEAN WILMOT,
BY Robert H. Himes
ATTORNEY.

INVENTOR.
RICHARD DEAN WILMOT,
BY Robert H. Hines
ATTORNEY.

INVENTOR.
RICHARD DEAN WILMOT,
BY
Robert H. Himes
ATTORNEY.

RADAR VIDEO PROCESSING APPARATUS

This invention relates to apparatus including a solid area matrix device for distinguishing between valid and invalid target video returns by means of pattern recognition of quantized video hit returns.

A major problem in automatic detection, acquisition and digital track-while-scan systems is the automatic processing of all of the video returns from a surveillance radar. Valid targets are usually generated by exceeding a threshold count of quantized (digitized) video hits; this is usually determined by a sequential observer type counter or a "sliding window" type threshold count detector. These devices indicate a valid radar target return when the number of digital video hits exceeds the threshold count value within a particular range increment (range bin). However, ground clutter, sea clutter, weather returns, radar interference and jamming can all produce sufficient hits in a range bin to indicate a valid target return. In some systems, all target reports are stored in a computer memory and processed by a computer program to distinguish between valid and invalid target reports while in other systems a running count of the hits in an area is made and when the count becomes too high no automatic track acquisition is allowed (all target reports are inhibited) in the area. Both of these methods require extensive equipment. The first system requires a very large memory to store the large number of invalid tracks which typically exceed 1,000 false tracks per radar antenna scan whereby a complex computer program to distinguish valid tracks from invalid tracks in memory is required. The other method, on the other hand, requires a large number of counts to be stored for determining the hit density of the respective areas. This requires storage of bits in both range and azimuth as well as count-up and count-down logic. Experience has shown that this method produces an average of 170 flase tracks per scan making it rather inefficient. This method has a slow response time and is incapable of detecting small, isolated clutter returns.

It is therefore an object of the present invention to provide an improved apparatus for distinguishing between valid and invalid target video returns by video hit pattern analysis.

Another object of the present invention is to provide a more economical and less complex apparatus for distinguishing between valid and invalid target video returns.

Still another object of this invention is to provide an apparatus capable of detecting comparatively small clutter returns in a manner superior to that of contemporary systems.

Still another object of the invention is to provide an apparatus which produces substantially fewer false or invalid targets than other contemporary systems.

A further object of the invention is to provide an apparatus for distinguishing between valid and invalid targets which utilizes two additional bits of memory per range bin together with other appropriate control logic.

A still further object of the present invention is to provide a less complex and less expensive radar video data processing apparatus which produces 40% fewer false targets than comparable contemporary systems.

In accordance with the present invention, invalid target returns are recognized and rejected on the basis of certain predetermined quantized video hit return patterns. In the typical situation, hits produced from a valid target will be one radar pulse width in range and one antenna beam width wide in azimuth. The apparatus of the present invention recognizes when this pattern does not exist and causes the pattern not conforming to the valid target pattern to be rejected. Following are quantized hit patterns, which indicate invalid targets whose patterns are detected and rejected by the apparatus of the present invention:

Pattern A:- Three pulse widths in range which occur three successive times in azimuth. This gives a solid hit pattern of 3 × 3.

Pattern B: Four pulse widths which occur two successive times in azimuth.

Pattern C: Five pulse widths in range which occur and are preceded or followed by three or more pulse widths in range.

Pattern D: Six pulse widths in range only. This range pattern alone defines invalid targets.

It is evident that other solid area patterns can be added if desired. These four patterns are, however, economical to implement to detect invalid tracks, and additional patterns would give only marginal improvement. It should be understood that each of the above patterns represents the minimum; i.e., any patterns that meet or exceed these patterns will also define an invalid track. For example, if four range pulse widths occurred followed in succession by three range pulse widths twice in succession, the video return would be defined as an invalid target. Also, the order of the range hits is not important. For example, either three successive hits in range followed by five successive hits in range or five range hits followed by three range hits or both are utilized.

The above-mentioned and other features and objects of this invention and the manner of obtaining them will become more apparent by reference to the following description taken in conjunction with the accompanying drawings, wherein.

Figure 1:
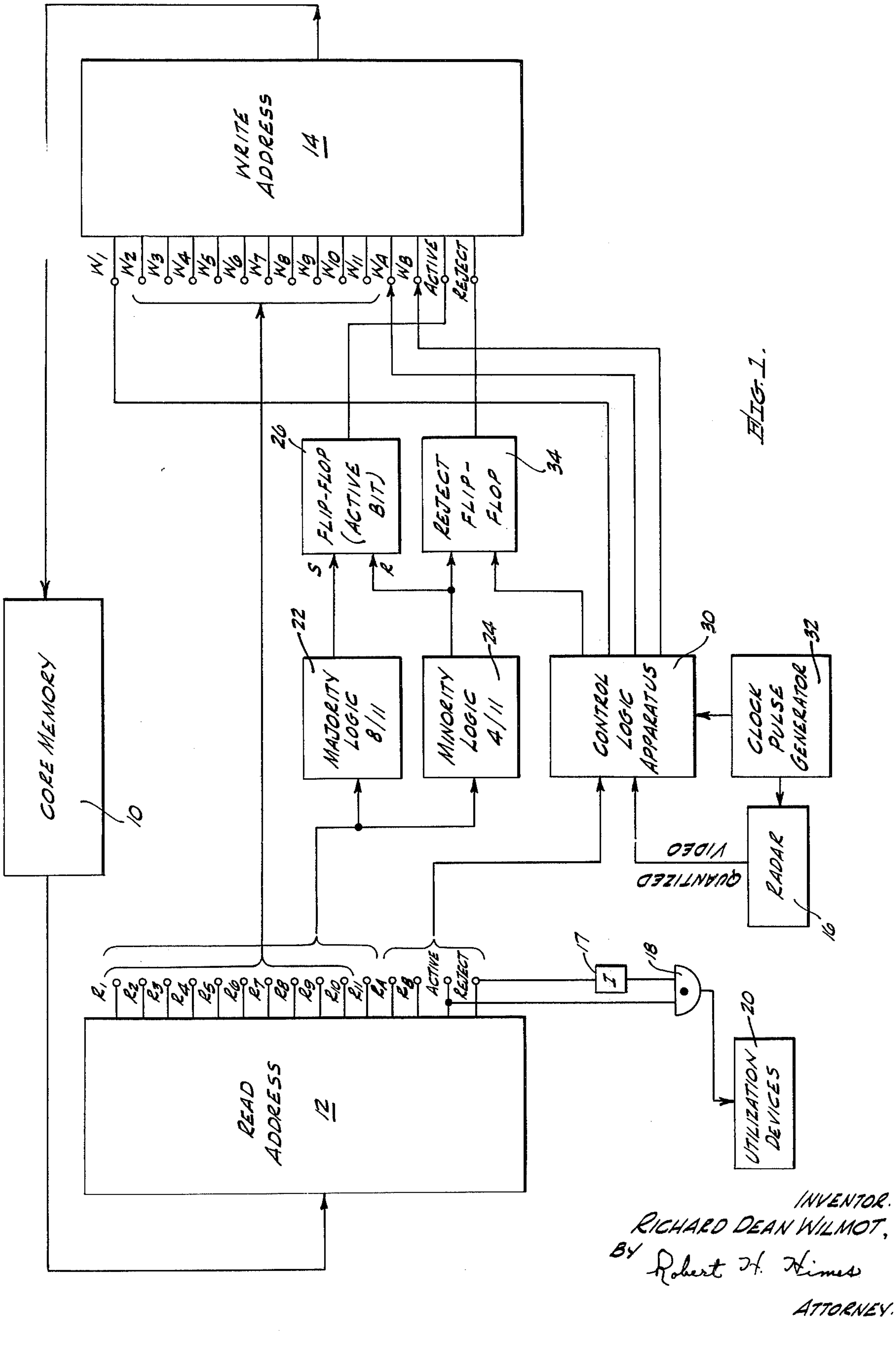
FIG. 1 illustrates a schematic block diagram of the apparatus of the present invention.
Figure 3:
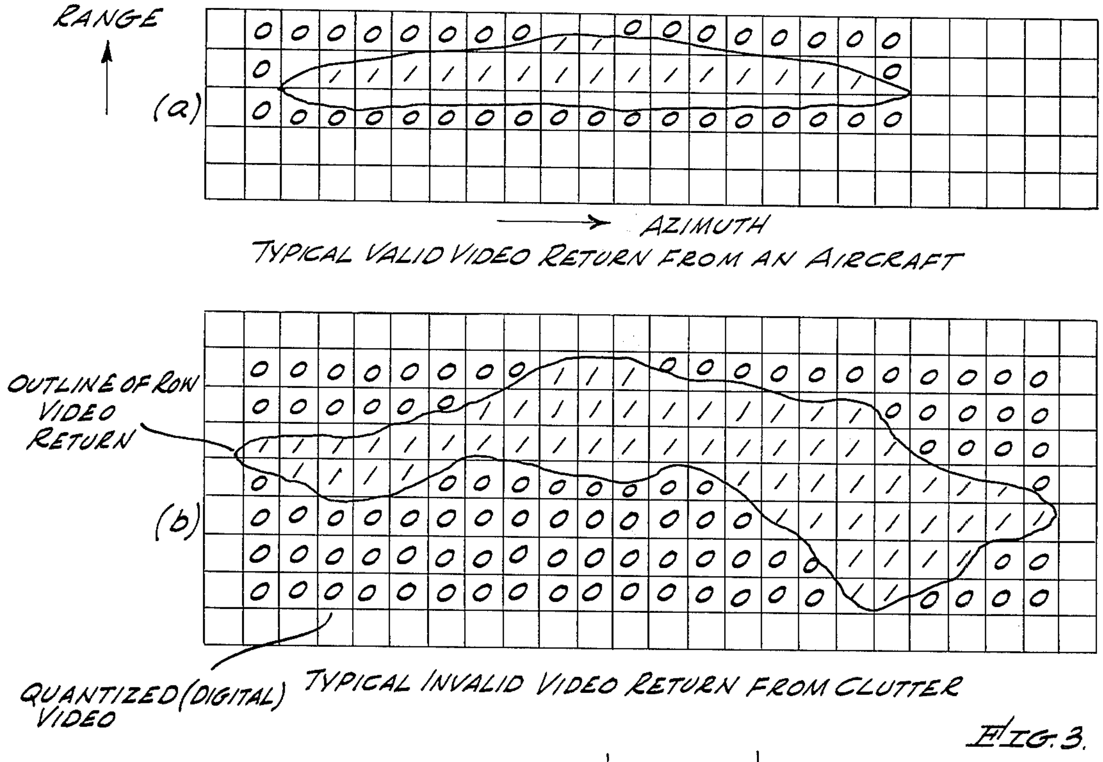
Figure 4:
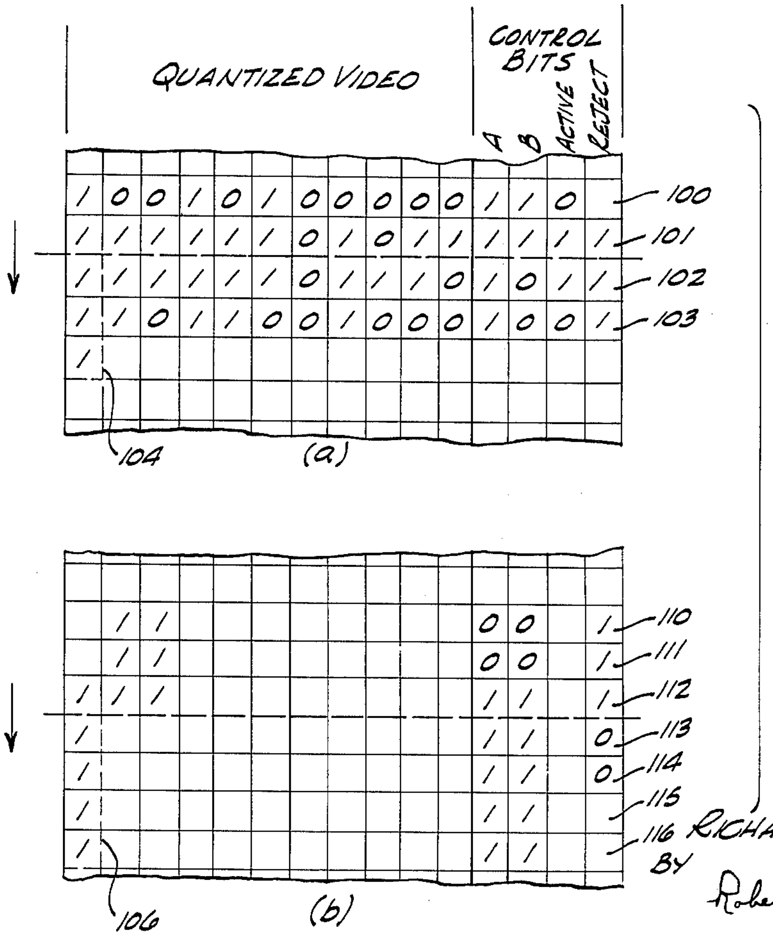

FIGS. 3(*a*) and 3(*b*) illustrate typical valid and invalid quantized video return from aircraft and clutter, respectively; and FIGS. 4(*a*) and 4(*b*) show examples of hit patterns in connection with the operation of the apparatus of FIG. 1.

In describing the apparatus of the present invention, a convention is employed wherein individual "and" and "or" gates are shown as semicircular blocks with the inputs applied to the straight side and the output appearing on the semicircular side. An "and" gate is indicated by a dot (.) and an "or" gate by a plus (+) in the semicircular block. As is generally known, an "and" gate produces a "one" or information level output signal only when every input is at the information level; whereas, an "or" gate produces an information level output signal when any one of the input signals applied thereto are at the information level.

Also, in addition to the above, a convention is employed in describing the particular embodiment of the present invention wherein the two inputs of the flipflops are designated as "set" and "reset" inputs. An information level signal applied to either the set or reset inputs of a flip-flop will change its state in a manner such that an information level signal appears at the corresponding principal or complementary output terminals. Further, if information level signals are applied to both the set and reset inputs of a flip-flop, the flip-flop will revert to the reset state. If no input signals are applied, the flip-flop will remain in its previous state.

In the following description, it is presumed that flip-flops having a negligible delay time will be employed whereby logic propagation is complete at the termination of each range bin or bit interval. If delay time cannot be made negligible, it becomes necessary to employ synchronizing means to compensate for the different delays which occur in processing so that the control bits are properly aligned with the quantized video bits. The use of synchronizing delay means is well known in the digital computer art.

Referring now to FIG. 1 of the drawings, there is shown a schematic block diagram of an embodiment of the present invention wherein a core memory 10 is provided with a parallel read address 12 and a parallel write address 14. The core memory 10 is provided with fifteen channels (bits) for use in conjunction with the apparatus of the present invention, each channel having a length of 1,024 words or "range bins." Of the fifteen channels in core memory 10, eleven channels are allocated for storing quantized video sweeps from a radar system 16, two additional channels are allocated to the storage of A and B bits which constitute a code indicative of certain target patterns, as will hereinafter be explained, and the remaining two channels are allocated to the storage of an "active" bit and a "reject" bit. by way of explanation, an active bit indicates the existence of a target threshold count within the corresponding range bin for the quantized video currently stored in the core memory 10. A reject bit, on the other hand, indicates that a target designated by a concomitant active bit is, in fact, clutter, and, accordingly, should not be considered or used. Consequently, the reject output from the read address 12 is applied through an inverter 17 to the input of an and gate 18 along with the output from the active channel. Thus, a target output is received from and gate 18 only when there is a one set in the active bit channel concurrently with a zero in the reject channel. The output from and gate 18 is applied to utilization device 20 which may, for example, constitute display devices or additional computer devices for further data processing.

In the drawing, the eleven outputs from the read address 12 allocated to quantized video sweeps are designated $R_1$ to $R_{11}$, and the outputs from the A and B channels are designated $R_A$ and $R_B$, respectively. The eleven inputs allocated to the quantized video sweep channels in the write address 14, on the other hand, are designated $W_1$ to $W_{11}$, and the two inputs allocated to channels A and B are designated $W_A$ and $W_B$, respectively. The active and reject channels have a common designation in both the read address 12 and the write address 14.

The outputs from the channels $R_1$ through $R_{10}$ of the read address 12 are connected, respectively, to the channels $W_2$ to $W_{11}$ of the write address 14. Thus, each time a new quantized video sweep is received and applied to the $W_1$ input of write address 14, the information in each of the channels $R_1$ to $R_{10}$ is moved over by one channel, and the information in channel $R_{11}$ is abandoned. Thus the quantized video from the last eleven scans are stored in channels 1 – 11, the video from the current scan being stored in channel No. 1 and the progressively older video being stored in the higher numbered channels. In addition to the foregoing, the outputs $R_1$ to $R_{11}$ of read address 12 are applied to the inputs of a majority logic gate 22 and to the inputs of a minority logic gate 24. The majority logic gate 22, for example, is designed to provide an information level output when eight of the eleven inputs $R_1$ to $R_{11}$ are 1's and a zero level output at all other times. The minority logic gate, on the other hand, is designed to provide an information level output when four or fewer of the outputs $R_1$ to $R_{11}$ are 1's. It is evident that the minority logic gate 24 operates in the same manner as a majority logic gate with the exception that all of the inputs are inverted whereby the minority logic gate counts 0's instead of 1's. Thus, in actuality, the minority logic gate produces an information level output when seven or more of the inputs are 0's. The outputs from the majority and minority logic gates 22, 24 are connected to the set and reset inputs, respectively, of an active bit flip-flop 26, the principal output of which is, in turn, connected to the active channel input of write address 14. A count exceeding eight 1's or more out of the eleven quantized video channels within a range bin indicates that there is a target at the range corresponding to the range bin. After a target is indicated, a decrease to four or fewer 1's in the same range bin indicates that the radar has moved off of the target. The active bit flip-flop 26 will, accordingly, be reset, thereby to erase the 1 in the active bit channel in the core memory 10 corresponding to the aforementioned range bin.

In addition to the above, control logic apparatus 30, in accordance with the present invention, receives quantized video from radar system 16, a clock pulse signal from a clock pulse generator 32, together with the $R_A$, $R_B$, and the reject output from the read address 12. Clock pulse generator 32 additionally provides synchronization to the radar system 16 so that one clock pulse occurs during each range bin of the quantized video signal. The control logic apparatus 30 provides the most recent quantized video signal which is connected to the $W_1$ input of write address 14, the A and B code which is connected to the $W_A$ and $W_B$ inputs of write address 14, and a reject output which is connected to the set input of a reject flip-flop 34. The reset input of reject flip-flop 34 receives signals from the output of the minority logic gate 24 and the principal output thereof is connected to the reject channel input of write address 14.

Figure 2:
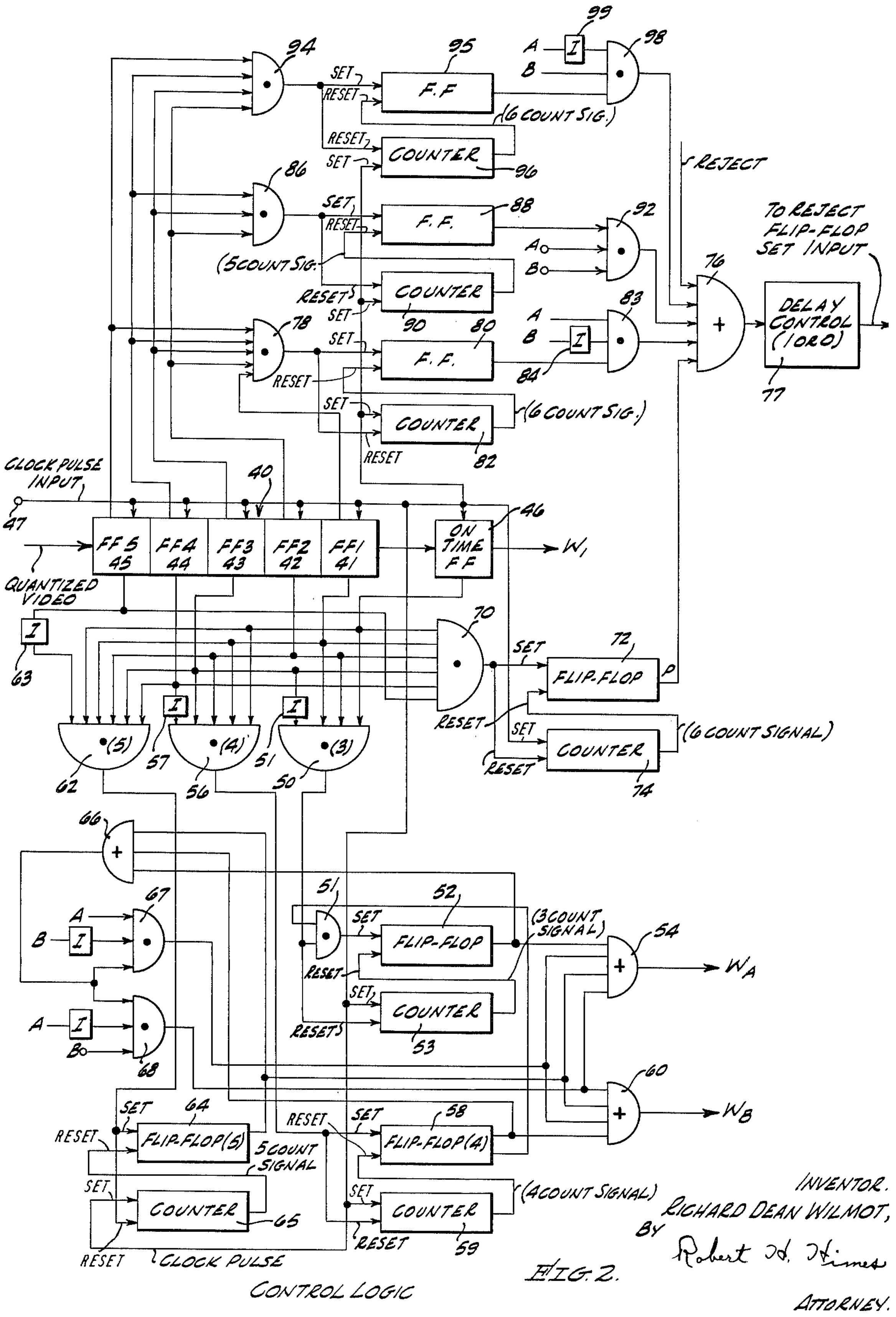
FIG. 2 shows details by way of example of the control logic in the schematic block diagram in the apparatus of FIG. 1.

Referring now to FIG. 2 of the drawings, there is shown, by way of example, a manner in which the control logic apparatus 30 may be implemented. The control logic apparatus 30 includes a shift register 40 which constitutes delay flip-flops 41, 42, 43, 44, 45, together with an on-time flip-flop 46. Each of the delay flip-flops 41–45 and the on-time flip-flop 46 have a synch input responsive to clock pulses available at a clock pulse input 47. The flip-flops 45–41 and 46 are connected in cascade in the order named from input to output. Each clock pulse causes the state or information in each of the flip-flops 41–46 to advance to the next succeeding flip-flop. The quantized video from the radar 16 is applied to the input of flip-flop 45 and the output of on-time flip-flop 46 is connected to the $W_1$ input of write address 14.

As previously specified, a code which is stored in channels A and B of core memory 10 is employed to denote the occurrence of three, four or five 1's in sequence or three 1's in sequence occurring for two successive azimuth sweeps of the radar 16. The code employed, by way of example, in the apparatus of FIG. 2 is as follows:

| | | A | B |
|---|---|---|---|
| Three | "1's" occurring in range sequence | 1 | 0 |
| Four | "1's" occurring in range sequence | 0 | 1 |
| Five | "1's" occurring in range sequence or three "1's" occurring in range sequence for two successive azimuth sweeps | 1 | 1 |

The code may be implemented by connecting principal outputs from the on-time flip-flop 46 and flip-flops 41, 42 to the inputs of a four-input and gate 50. In addition, the principal output from flip-flop 43 is connected through an inverter 51 to the remaining input. Alternatively, the complementary output from flip-flop 43 could be connected directly to the remaining input of and gate 50 but inverters are used throughout the present description in order to simplify the wiring diagrams. The output of and gate 50 is connected through an interlock and gate 51 to the set input of a flip-flop 52 and to the reset input of a 2-stage counter 53. The counter receives clock pulse signals by means of a connection to clock pulse input terminal 47 which cause the counter to count at the clock pulse rate. The counter 53 is provided with appropriate gating which provides an information level signal during the third bit following reset of the counter to a reference state. This signal is designated as a 3-count signal and is applied to the reset input of flip-flop 52 to terminate the information level signal at the principal output thereof. The principal output of flip-flop 52 is connected through an or gate 54 to the $W_A$ input of write address 14.

Next, principal outputs from the on-time flip-flop 46 and delay flip-flops 41, 42, 43 are connected to inputs of a five-input and gate 56. In addition, the principal output of flip-flop 44 is connected through an inverter 57 to the remaining input. The output from and gate 56 is connected to the set input of flip-flop 58 and to the reset input of a 2-stage counter 59. As in the case of counter 53, counter 59 receives clock pulses from the clock pulse input 47. In addition, counter 59 generates an output signal during the fourth bit following reset, designated as a 4-count signal. This 4-count signal is applied to the reset input of flip-flop 58 thereby to terminate the information level signal at the principal output thereof. The principal output of flip-flop 58 is connected through an or gate 60 to the $W_B$ input of write address 14 and the complementary output thereof connected to an input of the and gate 51 to prevent the flip-flop 52 from being set when the principal output of flip-flop 58 is at the information level.

Further, principal outputs from on-time flip-flop 46 and delay flip-flops 41, 42, 43, 44 are connected to respective inputs of a six input and gate 62 and the principal output from delay flip-flop 45 is connected through an inverter 63 to the remaining input of and gate 62. The output from and gate 62 is connected to the set input of a flip-flop 64 and to the reset input of a counter 65. As in the case of counters 53, 59, counter 65 receives clock pulses from clock pulse input terminal 47 and produces an information level signal during the fifth bit after reset. This signal is designated as a 5-count signal and is applied to the reset input of flip-flop 64 to terminate the information level signal at the principal output thereof after five bits. The principal output of flip-flop 64 is connected to inputs of both or gates 54, 60 to generate the A=1, B=1 code. In addition, the principal outputs from flip-flops 52, 58, 64 are connected to a three-input and gate 66, the output from which is connected to an input of a three-input and gate 67 and to an input of a three-input and gate 68. Signals A and $\overline{B}$ are connected to the remaining inputs of the three-input and gate 67, and signals $\overline{A}$ and B to the remaining inputs of and gate 68, the outputs from which are connected to inputs of both or gates 54, 60 so as to generate the A=1, B=1 code. In this case, signals $\overline{A}$ and $\overline{B}$ are provided with appropriate inverters. Thus, it is apparent that when the 1's exist on the principal outputs of the on-time flip-flop 46 and delay flip-flops 41, 42 and a 0 exists on the principal output of delay flip-flop 43, the requirements for generating a 1 output from and gate 50 will have been met. This 1 output sets the flip-flop 52 thereby causing a 1 to be written in the $W_A$ channel of write address 14. In addition to setting the flip-flop 52, the 1 resets the counter 53 to a reference state whereby the 3-count signal is not generated until three clock pulses later. This 3-count signal resets flip-flop 52 thereby discontinuing the 1's being written in channel $W_A$. The requirement of a 0 at the principal output of flip-flop 43 insures that a 0 will be written in channel B. The flip-flops 58, 64 operate in a similar manner in conjunction with counters 59, 65, the respective principal outputs of flip-flop 58 writing a 1 in the channel $W_B$ and the principal output from flip-flop 64 generating a 1 in both channels $W_A$ and $w_B$. The function of the inverters 51, 57, 63 is to determine the specific nature of the information temporarily stored in shift register 40. For example, the inputs to and gate 50 from delay flip-flops 41, 42 and on-time flip-flop 46 may indicate that there is a sequence of three 1's in the shift register 40. The inverter 51, however, connected from delay flip-flop 43, will determine that there is not a sequence of four 1's in the shift register 40. Similarly, inverters 57, 63 will determine that it is not a sequence of five 1's or six 1's in the shift register 40 so that the appropriate code signals will be generated and applied to the $W_A$ and $W_B$ channels of write address 14. Also, as noted above, A=1, B=0 is the code for a sequence of three 1's and A=0, B=1 is the code for a sequence of four 1's in the previous azimuth sweep. Thus, when either of these codes occurs simultaneously with three, four or five 1's in the present azimuth sweep, the inputs to the and gates 67 or 68 will all be at the information level thereby generating an information level signal in both the $W_A$ and $W_B$ channels whereby the code A=1, B=1 is recorded.

In addition to the above, the control logic apparatus 30 includes logic for setting the reject flip-flop 34 thus making the determination that a recorded target in a particular range bin is, in actuality, clutter. The occurrence of six 1's in sequence in a single azimuth sweep is by itself considered to be clutter. This determination is made by a six-input and gate 70 connected to the principal outputs of delay flip-flops 41–45 and on-time flip-flop 46. The output of and gate 70 is connected to the set input of a flip-flop 72 and to the reset input of a counter 74 which receives clock pulses from the clock pulse input terminal 47 and generates a 6-count signal which is applied to the reset input of flip-flop 72.

Thus, the occurrence of six 1's in the shift register 40 generates an information level signal at the output of and gate 70 which sets the flip-flop 72. The principal output from flip-flop 72 is applied through an or gate 76 through a manually operated 1 or 0 bit delay control device 77 to the set input of reject flip-flop 34. This reject signal is developed for six range bins after which the flip-flop 72 is reset by the 6-count signal from counter 74. In the event that additional 1's follow the initial group of six 1's in the shift register 40, the counter 74 will be continually reset to its reference state whereby the reject signal will be developed for all of the 1's in the series. The manually operated 1 or 0 bit delay control device 77 is used when it is desired to modify the clutter reject patterns so as to give a single target indication on the leading edge of multiple targets or clutter. In this event, the device 77 is set so as to delay a reject bit for one range bin thus allowing the quantized video to appear as a target.

The reject implementation for three 1's followed by five 1's is provided by a five-input and gate 78 having inputs from each of the principal outputs of delay flip-flops 41–45 of shift register 40. The output of and gate 78 is connected to the set input of a flip-flop 80 and to the reset input of a 3-stage counter 82. As before, counter 82 receives clock pulse signals from the clock pulse input 47 and is provided with appropriate gating so as to generate a 6-count signal which is applied to the reset input of flip-flop 80. The principal output of flip-flop 80 is connected to one input of a three-input and gate 83. The signal A and the signal B connected through an inverter 84 are connected to the remaining two inputs of and gate 83. As previously specified, a code A=1, B=0 designated a sequence of three 1's in the previous azimuth sweep. Thus, if the flip-flop 80 is set by a series of five 1's in the shift register 40 simultaneously with the code A=1, B=0 being read out of the read address 12, an information level signal is generated at the output of and gate 83. This output is connected through or gate 76 to the set input of reject flip-flop 34. It is apparent that the degree of overlap or stagger of the five 1's in the video sweep being received with the three 1's in the previous video sweep can be controlled by the count signal of counter 82.

The reject implementation for three 1's following five 1's or, in the alternative, three 1's following three 1's in two prior azimuth sweeps is provided by a three-input and gate 86. Three-input and gate 86 has inputs connected to the principal outputs of delay flip-flops 42, 43, 44 and an output connected to the set input of a flip-flop 88 and to the reset input of a counter 90. Counter 90 receives clock pulses from clock pulse input 47 and generates a 5-count signal which is applied to the reset input of flip-flop 88. The principal output of flip-flop 88, together with signals A and B, are applied to the respective inputs of a three-input and gate 92, the output of which is connected through or gate 76 to the set input of reject flip-flop 34. The 5-count signal developed by counter 90 allows a reject signal to be generated for all five of a series of five 1's when the five 1's precede the three 1's by two range bins.

Lastly, the reject implementation for four 1's following four 1's is provided by a four-input and gate 94 responsive to the principal outputs of delay flip-flops 42, 43, 44, 45. The output of and gate 94 is connected to the set input of a flip-flop 95 and to the reset input of a counter 96. As before, counter 96 receives clock pulses from clock pulse input 47 and, in addition, generates a 6-count signal which is applied to the reset input of flip-flop 95. The principal output of flip-flop 95 is connected to an input of a three-input and gate 98 along with the signal A connected through an inverter 99 and the signal B. The code A=0, B=1 signifies a series of four 1's in the previous azimuth sweep. Thus, when this has been the case, if four 1's are received in the azimuth sweep being received, the flip-flop 95 is set and an information level signal is generated at the output of and gate 98. This output is connected through the or gate 76 to the set input of reject flip-flop 34. The degree of stagger between the previous four 1's and the present four 1's can be controlled by the length of count of the count signal developed by counter 96. A 6-count signal allows stagger of two 1's between the successive groups of four 1's. In no case, however, is a reject signal generated outside of the A and B code unless there are six or more 1's in the azimuth sweep being received. Also, the reject signal is applied directly to an input of or gate 76 in order to retain a reject bit once generated until there is a determination that there is no longer a target by the minority logic gate 24.

Referring to FIG. 3(*a*), there is shown three corresponding range bins of quantized video from eighteen successive sweeps. In this figure, the 1's illustrate typical valid video return from a target such as an aircraft. As is evident from the drawing, there is a maximum of two 1's in range visible at the center portion of the target area. A video pattern of this type would not cause the generation of any reject bits. Referring now to FIG. 3(*b*), there is shown seven range bins of quantized video from twenty-two successive sweeps. The bits, or 1's, in this outline of raw video return illustrate typical invalid video returned from clutter. In the operation of a radar data processing system, it is desirable to reject this type of target so as not to overload associated computing apparatus. There are numerous combinations of 1's in this pattern that would cause the apparatus of the invention to reject the targets as clutter. A more detailed description of the manner in which reject bits are generated appears in connection with the description of FIG. 4.

Referring to FIG. 4(*a*), there is illustrated an example of information in the core memory during the operation of the apparatus of the present invention. In the illustration, the columns 1–11 denote columns allocated to storage of azimuth sweeps; columns 12 and 13 provide memory for the A and B code; and columns 14 and 15 provide storage for the active and reject bits, respectively. Referring to FIG. 4(*a*), the horizontal dashed line, as viewed in the drawing, illustrates the instant of change during which the illustration is written, range bins 100, 101 having been processed and range bins 102 and 103 to be processed and the columns 1–10 shifted one column to the right, as shown, to clarify the drawing. In range bin 100, the number of quantized video returns is less than eight; hence, a zero has been written in the active channel. In range bin 101, however, the number of hits or 1's equal nine, whereby an active bit has been written in the active channel for this range bin. Range bin 102 illustrates the row in which logic is currently being generated and the 1's within a dashed rectangle 104 in channel 1 indicate quantized video currently in the shift register 40 and not yet written into the core memory 10. Five 1's in sequence, however, have been detected. Hence, the code A=1, B=1 has been written into channels 12 and 13 for range bins 100, 101. Also, channel 1 indicates five 1's following three 1's in series in channel 2. This will activate and gates 78 and 83 which will, in turn, generate a reject bit coextensive with the A and B code in channels 12 and 13. Thus, as the dashed line progresses down the page in the direction of the arrow, the A and B code will be changed from A=1, B=0 to A=1, B=1, and reject bits will be recorded in range bins 101, 102 and 103, the range bins corresponding to the previous code A=1, B=0.

Referring to FIG. 4(*b*), the horizontal dashed line, as before, shows the instant in which logic is being generated and the dashed-line rectangle 106 shows delayed quantized video in the shift register 40. Range bins 110–116 designate successive range bins during the illustration and the columns 1–10 being staggered to columns 2–11 to clarify the illustration. In the prior two azimuth sweeps, 1's appear in range bins 110, 111 and 112. In the present azimuth sweep, however, a series of five 1's exists in rows 112–116. The three 1's in the two prior azimuth sweeps generated the code A=1, B=1. This code, however, in range bins 110, 111, was changed to A=0, B=0 because there were no 1's in range bins 110, 111 of the video sweep being received. There are, however, five 1's in sequence from rows 112–116 thereby generating the code A=1, B=1 in the A and B columns. In addition, the 1's being received activate the three-input and gate 86 two range bins in advance of the on-time flip-flop 46; i.e., two range bins prior to being written into the core memory 10. Since the code A=1, B=1 is being read out of the memory 10, and gate 92 is activated thereby generating reject signals in range bins 110, 111 and 112. In making this illustration, other 1's that necessarily would be in the memory 10 have been omitted in order to more clearly present the foregoing examples.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An apparatus for processing successive video sweeps generated by a radar system and quantized into a series of range bins each including a 1 or a 0 representing a target hit or no target hit, respectively, said apparatus comprising: a memory device have a plurality of channels including 1, 2, 3, . . . ($n$—1), $n$ channels for storing $n$ successive quantized video sweeps from said radar system, $n$ being an integer no less than three, and A, B, active and reject channels for storing first and second code bits, active bits and reject bits, respectively; means coupled to said memory device and including a read address and a write address for reading from and writing into successive range bins of said plurality of channels in a direction corresponding to increasing ranges; means coupled from said read to said write address for transferring said quantized video from said 1, 2, 3, . . . ($n$—1) channels to said 2, 3, . . . $n$ channels, respectively; means coupled from said $n$ channels of said read address to said active bit channel of said write address for generating an active bit in response to $m$ 1's from the respective range bins of said $n$ channels, $m$ being an integer less than $n$; means coupled from said $n$ channels of said read address to said active bit channel of said write address for erasing said active bit and any corresponding bit in said reject channel in response to a predetermined number less than $m$ 1's from the respective range bins of said $n$ channels; means coupled from said A, B and reject channels of said read address to said A, B, reject and said 1 channel of said $n$ channels of said write address and responsive to said quantized video sweeps generated by said radar system for generating and writing a code in said A and B channels indicative of predetermined successive occurrences of 1's in said quantized video sweeps, for generating and writing 1 bits in said reject channel indicative of predetermined successive occurrences of 1's in corresponding range bins of no less than two successive video sweeps, and for writing said quantized video in said 1 channel of said $n$ channels; and utilization means responsive to the simultaneous existence of 1's in said active channel and to the non-existence of 1's in said reject channel for indicating targets detected by said radar.

2. The apparatus for processing successive video sweeps generated by a radar system and quantized into a series of range bins each including a 1 or a 0 representing a target hit or no target hit, respectively, as defined in claim 1 wherein said means coupled from said A, B and reject channels of said read address to said A, B, reject and said 1 channel of said $n$ channels of said write address and responsive to said quantized video sweeps generated by said radar system includes a multiple-stage shift register having an input responsive to said quantized video sweeps and an output connected to said 1 channel of said $n$ channels of said write address; means coupled to no less than three successive stages of said shift register and having an output coupled to said A channel of said write address for writing a 1 therein in response to 1's in each of said three successive stages; means coupled to no less than four successive stages of said shift register and having an output coupled to said B channel of said write address for writing a 1 therein in response to 1's in each of said four successive stages; and means coupled to no less than five successive stages of said shift register and having an output coupled to said A and B channels of said write address for writing 1's therein in response to 1's in each of said five successive stages of said shift register.

3. The apparatus for processing successive video sweeps generated by a radar system and quantized into a series of range bins each including a 1 or a 0 representing a target hit or no target hit, respectively, as defined in claim 2, wherein said means coupled from said A, B and reject channels of said read address to said A, B, reject and said 1 channel of said $n$ channels of said write address and responsive to said quantized video sweeps generated by said radar system additionally includes means responsive to said A and B channels from said read address and coupled to said no less than three and said no less than four successive stages of said shift register and having an output coupled to said A and B channels of said write address for writing 1's therein in respnose to a 1 in either of said A and B channels from said read address together with 1's in each of said no less than three of 1's in each of said no less than four successive stages of said shift register.

4. The apparatus for processing successive video sweeps generated by a radar system and quantized into a series of range bins each including a 1 or a 0 representing a target hit or no target hit, respectively, as defined in claim 1, wherein said means coupled from said A, B and reject channels of said read address to said A, B, reject and said 1 channel of said *n* channels of said write address and responsive to said quantized video sweeps generated by said radar system includes a multiple-stage shift register having an input responsive to said quantized video sweeps and an output connected to said 1 channel of said *n* channels of said write address; and means responsive to said A and B channels of said read address and coupled to no less than three successive stages of said shift register and having an output coupled to said reject channel of said write address for writing a 1 bit therein in response to 1's in each of said no less than three successive stages together with binary code signals from said A and B channels of said read address indicative of five successive 1's in corresponding range bins of the previous quantized video sweep.

5. The apparatus for processing successive video sweeps generated by a radar system and quantized into a series of range bins each including a 1 or a 0 representing a target hit or no target hit, respectively, as defined in claim 1, wherein said means coupled from said A, B and reject channels of said read address to said A, B, reject and said 1 channel of said *n* channels of said write address and responsive to said quantized video sweeps generated by said radar system includes a multiple-stage shift register having an input responsive to said quantized video sweeps and an output connected to said 1 channel of said *n* channels of said write address; and means responsive to said A and B channels of said read address and coupled to no less than four successive stages of said shift register and having an output coupled to said reject channel of said write address for writing a 1 bit therein in response to 1's in each of said no less than four successive stages together with binary code signals from said A and B channels of said read address indicative of four successive 1's in corresponding range bins of the previous quantized video sweep.

6. The apparatus for processing successive video sweeps generated by a radar system and quantized into a series of range bins each including a 1 or a 0 representing a target hit or no target hit, respectively, as defined in claim 1 wherein said means coupled from said A, B and reject channels of said read address to said A, B, reject and said 1 channel of said *n* channels of said write address and responsive to said quantized video sweeps generated by said radar system includes a multiple-stage shift register having an input responsive to said quantized video sweeps and an output connected to said 1 channel of said *n* channels of said write address; and means responsive to said A and B channels of said read address and coupled to no less than five successive stages of said shift register and having an output coupled to said reject channel of said write address for writing a 1 bit therein in response to 1's in each of said no less than five successive stages together with binary code signals from said A and B channels of said read address indicative of three successive 1's in corresponding range bins of the previous quantized video sweep.

7. The apparatus for processing successive video sweeps generated by a radar system and quantized into a series of range bins each including a 1 or a 0 representing a target hit or a no target hit, respectively, as defined in claim 1, wherein said means coupled from said A, B and reject channels of said read address to said A, B, reject and said 1 channel of said *n* channels of said write address and responsive to said quantized video sweeps generated by said radar system includes a multiple-stage shift register having an input responsive to said quantized video sweeps and an output connected to said 1 channel of said *n* channels of said write address; and means coupled to no less than six successive stages of said shift register and having an output coupled to said reject channel of said write address for writing 1 bits therein corresponding to 1's in each of said no less than six successive stages of said shift register.

8. The apparatus for processing successive video sweeps generated by a radar system and quantized into a series of range bins each including a 1 or a 0 representing a target hit or no target hit, respectively, as defined in claim 1, wherein said means coupled from said A, B and reject channels of said read address to said A, B, reject and said 1 channel of said *n* channels of said write address and responsive to said quantized video sweeps generated by said radar system for generating and writing a 1 bit in said reject channel indicative of predetermined successive occurrences of 1's in corresponding range bins of no less than two successive video sweeps additionally includes means for delaying the initial 1 bit of each plurality of 1 bits written in said reject channel thereby to allow clutter outline and multiple targets to be processed.

* * * * *